United States Patent Office 3,557,065
Patented Jan. 19, 1971

3,557,065
PROCESS FOR PREPARATION OF
POLY(MALEIC ACID)
John H. Blumberg, Highland Park, and Donald G. Mac-
Kellar, Trenton, N.J., assignors to FMC Corporation,
New York, N.Y., a corporation of Delaware
No Drawing. Filed Sept. 29, 1969, Ser. No. 862,059
Int. Cl. C08f 1/60, 3/48
U.S. Cl. 260—78.4                                  7 Claims

ABSTRACT OF THE DISCLOSURE

A method for the preparation of light colored poly-
(maleic acid) which comprises homopolymerizing maleic
anhydride in the presence of an acyl maleyl peroxide
initiator and a boric acid compound and, thereafter, hy-
drolyzing the resulting poly(maleic anhydride). Poly(ma-
leic acid) and salts thereof may be effectively utilized
in a wide variety of application and, notably, as deter-
gent builders and surface active agents.

BACKGROUND OF THE INVENTION

Recently developed methods for homopolymerizing
maleic anhydride are well known to those skilled in
the art. A typical method may be found in U.S. Pat.
3,359,246, issued Dec. 19, 1967, wherein the homopoly-
merization procedure involves reacting a melt of maleic
anhydride in the presence of an acetyl peroxide initiator.

The anhydride homopolymer as well as poly(maleic
acid), which may be readily prepared therefrom, are
useful in a wide variety of applications such, for exam-
ple, as detergent builders, surface active agents and tex-
tile chemicals. Unfortunately, however, the polymeric
products produced, heretofore, have exhibited an unde-
sirable dark coloration which has proven to be a decided
deterrent to their use in textile and detergent applications,
and the like. Accordingly, the dark colored polymeric
products have been found unsuitable for use in applica-
tion wherein, otherwise, they exhibit excellent perform-
ance characteristics.

Attempts at remedying the latter difficulties by sub-
jecting the polymers to extensive purification and/or
bleaching have met with only partial success. Thus, puri-
fication procedures are incapable of effecting a total re-
moval of the coloration. The use of bleaching agents such
as peroxides and bisulfites has also been only partially
effective and, in addition, has proved to be an uneconomi-
cal procedure.

SUMMARY OF THE INVENTION

It is the prime object of this invention to modify the
procedure for homopolymerizing maleic anhydride in such
a manner that the resulting polymeric product and its de-
rivatives are substantially devoid of undesirable coloration.

It is a further object of the invention to provide this
color free material without adversely affecting the per-
formance characteristics of the resulting homopolymer.

Various other objects and advantages of this inven-
tion will become apparent to the practitioner from the
following detailed description thereof.

We have now surprisingly found that by homopoly-
merizing maleic anhydride in the presence of any acyl
maleyl peroxide free radical initiator and a boric acid
compound, the poly(maleic acid) which is eventually re-
covered is substantially devoid of the dark coloration
that is inherent in the poly(maleic acid) prepared by the
prior art methods. Furthermore, this novel reaction proc-
dure produces poly(maleic acid) in high yields without
having any adverse effect on the properties of the poly-
meric product. The light color of the poly(maleic acid)
enables it to be used in a variety of applications for which
it was previously unsuitable because of its dark color.

DESCRIPTION OF THE PREFERRED
EMBODIMENTS

In brief, the novel process of this invention comprises
(1) homopolymerizing, at elevated temperatures, maleic
anhydride in the presence of an acyl maleyl peroxide
free radical initiator and a boric acid compound, and
then (2) hydrolyzing the resulting poly(maleic anhy-
dride).

The acyl peroxide free radical initiator may either be in-
troduced fully prepared or, preferably, be generated in the
system prior to the initiation of the polymerization re-
action. Such in-situ formation results from the interaction,
in the system, of maleic anhydride and hydrogen per-
oxide which produces permaleic acid, followed by the
addition of an acylating agent which reacts with the per-
maleic acid to form acyl maleyl peroxide. Among the
applicable acylating agents are included: acyl anhydrides
such as acetic anhydride, propionic anhydride, benzoic
anhydride, trichloroacetic anhydride, trifluoroacetic anhy-
dride, tetraacetyl diborate and mixtures thereof; and ke-
tenes such as ketene, diphenyl ketene, dimethyl ketene and
the like. Accordingly, the acyl groups which are intro-
duced into the peroxide catalyst may contain aliphatic
groups having from 1 to 8 carbon atoms, cycloaliphatic
groups having up to 14 carbon atoms and phenyl groups
having up to 14 carbon atoms. It should also be noted
that substituent groups such as, halogeno, nitro, and cyano
groups and the like may be present on the acylating
agents, the carbon atoms in these substituent groups being
counted toward the total carbon atom content.

The in situ preparation of the acyl maleyl peroxide
initiator utilizing an acyl anhydride acylating agent is il-
lustrated by the following equations:

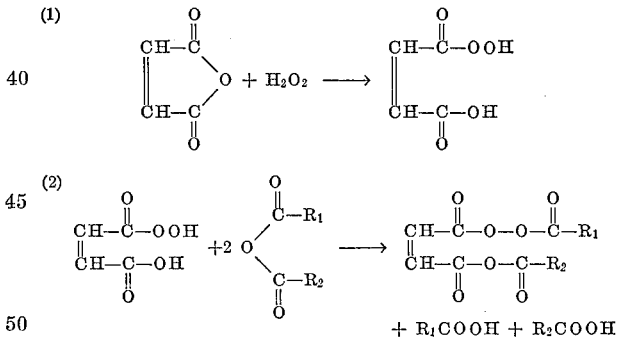

wherein $R_1$ and $R_2$ represent the unsubstituted and sub-
stituted aliphatic, cycloaliphatic and phenyl groups.

The boric acid compound is the key element in enabling
the novel process of this invention to produce a light
colored poly(maleic acid). For purposes of this inven-
tion, the term "boric acid compound" is intended to in-
clude boric acid and derivatives thereof. Among the ap-
plicable boric acid compounds are included: boric acid;
boric acid anhydride; tetraboric acid; hexaboric acid; al-
kali and alkaline-earth metal borates such as sodium meta-
borate and calcium metaborate; and boric acid esters
such as trimethyl borate, triethyl borate, triphenyl bor-
ate, and the like.

Tetraacetyl diborate, which is capable of participating in
the formation of the acyl maleyl peroxide initiator by its
ability to acetylate the permaleic acid while simultane-
ously introducing sufficient boric acid for the production of
the light colored reaction product, may be utilized in the
reaction system as a replacement for the individual acylat-
ing agents and boric acid compounds. Freshly prepared
tetraacetyl diborate is preferably utilized in the reaction, said tetraacetyl diborate resulting from the reaction of acetic anhydride and boric acid in accordance with the procedure described by Gerrard and Whelan in the June 24, 1954 issue of Chemistry and Industry at pages 758–9 and by Haith et al., Journal of the American Chemical Society, 79, 4243–4 (1957).

The actual homopolymerization procedure to be used in preparing the light colored poly(maleic acid) involves melting the maleic anhydride monomer and adding the acyl maleyl peroxide initiator thereto. The in situ formation of the peroxide initiator requires the maleic anhydride to be admixed with hydrogen peroxide and the desired acylating agent. Upon initiation of the polymerization reaction, the boric acid compound is added and the reaction allowed to continue within a general temperature range of from about 50° to 150° C.

The resulting crude poly(maleic anhydride) is then hydrolyzed to poly(maleic acid) by being dissolved in water which is preferably at a temperature of from about 40° C. to 100° C. Subsequent recovery provides a light colored poly(maleic acid) product in yields which exceed about 75%. Furthermore, metallic salts of the poly(maleic acid) can be produced by a variety of acid-salt conversion reactions which are well known to those skilled in the art.

Solvents may be utilized to facilitate the homopolymerization reaction and/or the recovery procedure. Their use is not required, however, in view of the quality products and high yields which are obtained in their absense. Applicable solvents include: aromatic solvents such as benzene, toluene, chlorobenzene and dichlorobenzene; cycloaliphatic solvents such as cyclohexanone; aliphatic solvents such as diethyl carbonate, diethyl oxalate, dimethoxy ethane and acetonitrile; and chlorinated solvents such as carbon tetrachloride, perchloroethylene, etc.

With respect to proportions, it is desirable to utilize at least about 1.0% of acyl maleyl peroxide initiator, as based on the weight of maleic anhydride monomer. Concentrations of initiator which exceed about 10% may be tolerated although no additional catalytic activity is derived from the increased amount. The boric acid compound is employed in a concentration which corresponds to at least about 0.5% of boron (calculated as elemental boron), based on the weight of maleic anhydride monomer and preferably from about 0.6–0.8% of boron. Concentrations which provide less than 0.5% boron do not provide adequate color improvement while concentrations whose boron content exceeds about 1.0% do not sufficiently improve upon the product color to warrant the expense inherent in the use of the additional material.

The following examples will further illustrate the embodiment of this invention. In these examples, all parts given are by weight unless otherwise noted.

EXAMPLE I

This example illustrates the preparation, by means of the novel process of this invention, of a typical color stabilized poly(maleic acid).

A reaction vessel fitted with means for mechanical agitation was charged with 500 parts of maleic anhydride. Heat was applied to the vessel until the maleic anhydride charge melted and the temperature leveled at 65–75° C. Thereafter, five parts of 90% hydrogen peroxide were added, under agitation, over a period of five minutes. The mixture was maintained at 65–75° C. for an additional 15–20 minutes to complete the formation of the permaleic acid, whereupon 50 parts of acetic anhydride were added thereto. With the formation of the diacetyl maleyl peroxide initiator and the initiation of the polymerization reaction, 20 parts of boric acid were added and the temperature was maintained at 75–80° C. The polymerization reaction then continued at 80–90° C. for a period of two hours and at 100° C. for an additional hour.

The resulting poly(maleic anhydride) was hydrolyzed to poly(maleic acid) by being dissolved in 2000 parts of hot water. The poly(maleic acid) was recovered as a white solid in a yield of 90%, based on the maleic anhydride feed.

This result is to be contrasted with a poly(maleic acid) control product which was prepared in the manner described hereinabove, with the exception that boric acid was entirely omitted therefrom. Although the control was also prepared in a 90% yield, it was found to exhibit a dark brown color.

In order to quantitatively determine the color differences between poly(maleic acid) prepared by the novel process of this invention and poly(maleic acid) prepared by the prior art procedure, 10%, by weight, aqueous solutions of the products were prepared and submitted to a color comparison test utilizing a Gardener Comparator. This device employs a series of colored liquids which range from clear to dark brown in their respective colors and which have arbitrary values assigned to them ranging from 1 for a clear color to 18 for a dark brown color. The solutions being tested are visually compared with the various liquids and are then assigned the numerical value, i.e., the Gardener value, of the liquid which most closely approximates its own color. Thus, the lighter the color of the polymer solution, the lower its assigned Gardener value.

Upon being subjected to this color comparison procedure, the poly(maleic acid) prepared hereinabove was given a Gardener value of 2, while the control polymer was given a value of 13. This data thus clearly illustrates the superior color exhibited by the poly(maleic acid) resulting from the novel preparative procedure of this invention.

EXAMPLE II

The recipes set forth in the following table were utilized to prepare poly(maleic acid) by means of the general procedure described in Example I, hereinabove.

The poly(maleic acid) prepared in each instance was then dissolved in distilled water to make a 10% solution, by weight, which, in turn, was submitted to the color comparison test described in Example I, the results of these determinations also appearing in the following table.

| | Recipe No., Parts | | | | | |
|---|---|---|---|---|---|---|
| | 1 | 2 | 3 | 4 | 5 | 6 |
| Maleic anhydride | 500 | 500 | 500 | 500 | 500 | 500 |
| 90% hydrogen peroxide | 5 | 5 | 5 | 5 | 5 | 5 |
| Propionic anhydride | 65 | 65 | | | | |
| Benzoic anhydride | | | 100 | 100 | | |
| Trichloracetic anhydride | | | | | 100 | 100 |
| Boric acid | 20 | | 20 | | 20 | |
| Yield (percent) | 87 | 87 | 76 | 75 | 91 | 92 |
| Gardener value | 3 | 14 | 3 | 17 | 2 | 16 |

| | Recipe No., Parts | | | | | | |
|---|---|---|---|---|---|---|---|
| | 7 | 8 | 9 | 10 | 11 | 12 | 13 |
| Maleic anhydride | 500 | 500 | 500 | 500 | 500 | 500 | 500 |
| 90% hydrogen peroxide | 5 | 5 | 5 | 5 | 5 | 5 | 5 |
| Acetic anhydride | 50 | 50 | 50 | 50 | 50 | | |
| Ketene | | | | | | 20 | 20 |
| Boric acid | | | | | | 20 | |
| Sodium metaborate | 20 | | | | | | |
| Trimethyl borate | | 20 | | | | | |
| Hexaboric acid | | | 20 | | | | |
| Triphenyl borate | | | | 20 | | | |
| Yield (percent) | 88 | 91 | 90 | 87 | | 91 | 89 |
| Gardner value | 3 | 2 | 3 | 3 | 13 | 2 | 12 |

The date summarized above further emphasizes the effectiveness of the novel process of this invention in preparing light colored poly(maleic acid).

EXAMPLE III

The reaction vessel fitted with means for mechanical agitation was charged with 25 parts of maleic anhydride. Heat was applied to the vessel until the maleic anhydride charge melted and the temperature leveled at 75° C. Thereafter, 0.06 parts of 90° hydrogen peroxide were added under agitation. The mixture was maintained at 75–80° C. for an additional 20 minutes, whereupon 5 parts of freshly prepared tetraacetyl diborate was added. The homopolymerization reaction was then allowed to proceed at 75–80° C. for a period of two hours and at 100° C. for an additional hour.

The resulting reaction mixture was dissolved in 100 parts of hot water in order to hydrolyze the anhydride groups. Upon removing the water, a 91.3% yield of poly(maleic acid) was recovered. A 10%, by weight, aqueous solution of the product was assigned a Gardener value of 3, thereby indicating the light color of the polymer product.

Summarizing, it is thus seen that this invention provides for the preparation of poly(maleic acid) which is substantially lighter in color than the poly(maleic acid) prepared heretofore.

Variations may be made in proportions, procedures and materials without departing from the scope of this invention which is defined by the following claims.

What is claimed is:

1. A process for preparing poly(maleic acid) which comprises the steps of:
   (a) heating maleic anhydride in the presence of an acyl maleyl peroxide free radical initiator wherein the noncarbonyl radical of said acyl component is selected from the group consisting of unsubstituted and substituted aliphatic groups having from 1 to 8 carbon atoms, unsubstituted and substituted cycloaliphatic groups having up to 14 carbon atoms, and unsubstituted and substituted phenyl groups having up to 14 carbon atoms, and a boric acid compound selected from the group consisting of boric acid, boric acid anhydride, hexaboric acid, tetraboric acid, alkali and alkaline-earth metal metaborates, and boric acid esters, said boric acid compound being present in a concentration corresponding to at least about 0.5% of elemental boron, based on the weight of maleic anhydride monomer;
   (b) hydrolyzing the anhydride moieties of the poly(maleic anhydride) resulting from step (a); and
   (c) recovering the poly(maleic acid).

2. The process of claim 1, wherein said acyl maleyl peroxide is present in a concentration of at least about 1%, based on the weight of maleic anhydride monomer.

3. The process of claim 2, wherein said acyl maleyl peroxide is formed in situ from the reaction of maleic anhydride, hydrogen peroxide and an acylating agent.

4. The process of claim 3, wherein said acylating agent is selected from the group consisting of acyl anhydrides and ketenes.

5. The process of claim 1, wherein said boric acid compound is present in a concentration corresponding to from about 0.6 to 0.8% of elemental boron, based on the weight of maleic anhydride monomer.

6. The process of claim 3, wherein said acyl maleyl peroxide is diacetyl maleyl peroxide and said boric acid compound is boric acid.

7. The process of claim 1, wherein said acyl maleyl peroxide and said boric acid compound are formed in situ from the reaction of maleic anhydride, hydrogen peroxide and tetra-acetyl diborate.

References Cited
UNITED STATES PATENTS

| | | | |
|---|---|---|---|
| 3,186,972 | 6/1965 | Lang et al. | 260—78.4 |
| 3,359,246 | 12/1967 | Berry | 260—78.4 |
| 3,457,240 | 7/1969 | Heuck et al. | 260—78.4 |

JOSEPH L. SCHOFER, Primary Examiner

J. KIGHT III, Assistant Examiner